(No Model.)
E. L. REESE.
BRAKE FOR RAILWAYS.
No. 364,437. Patented June 7, 1887.
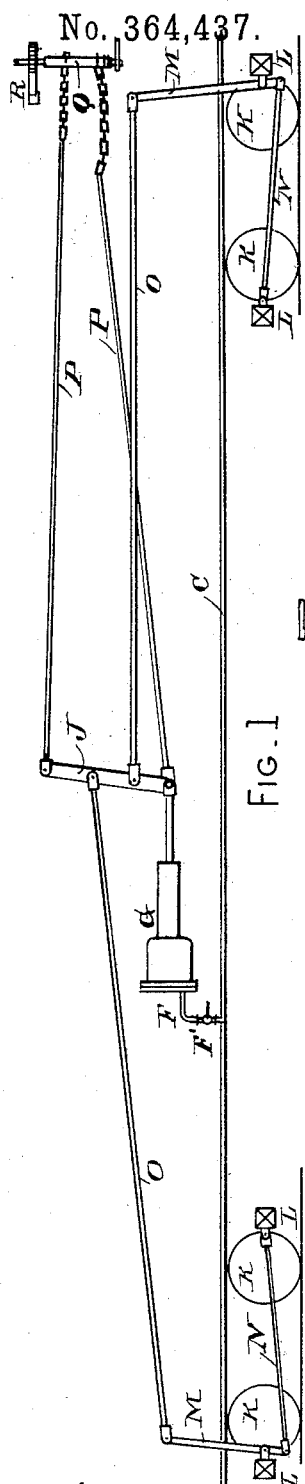
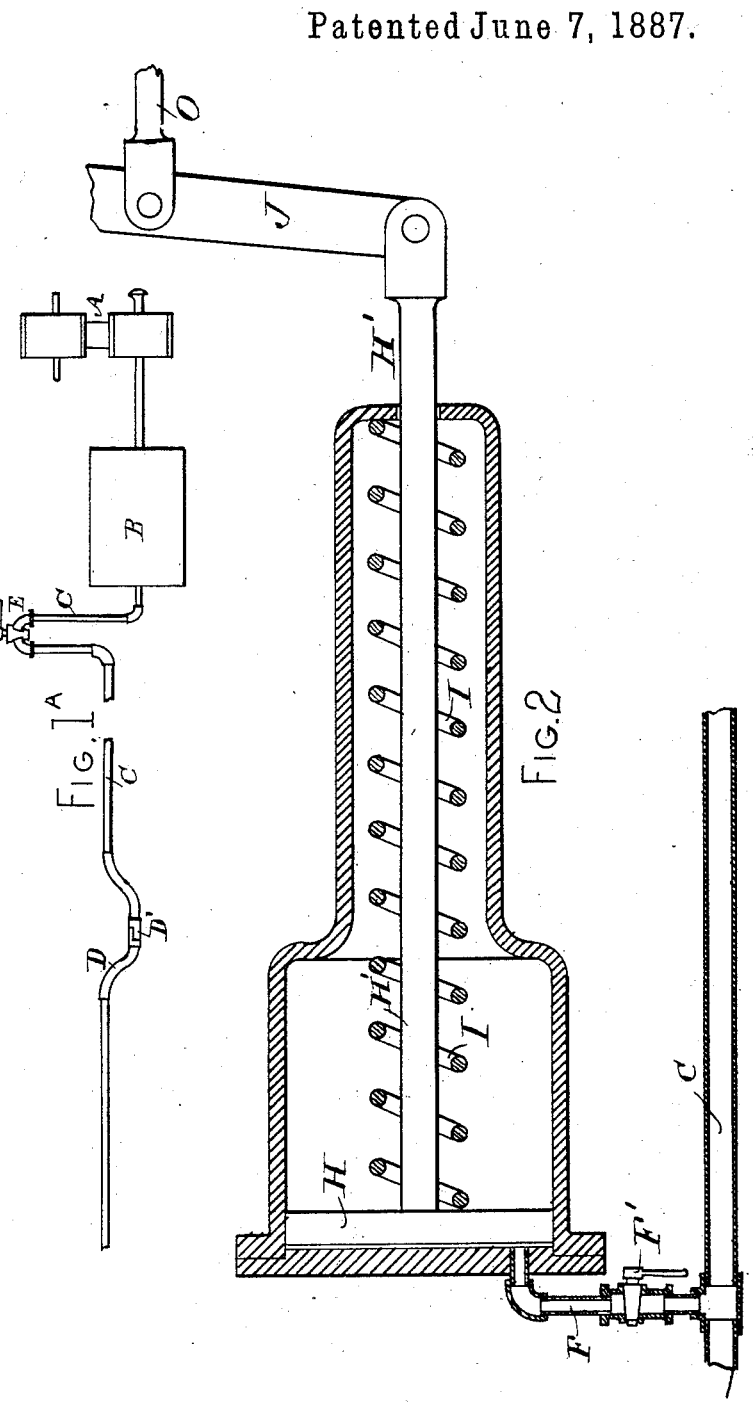

UNITED STATES PATENT OFFICE.

EVAN L. REESE, OF SAN FRANCISCO, CALIFORNIA.

BRAKE FOR RAILWAYS.

SPECIFICATION forming part of Letters Patent No. 364,437, dated June 7, 1887.

Application filed May 4, 1886. Serial No. 201,112. (No model.)

*To all whom it may concern:*

Be it known that I, EVAN L. REESE, a citizen of the United States, residing at San Francisco, State of California, have invented a new and Improved Brake for Railway Rolling-Stock, of which the following is a specification.

The invention relates to brakes used on both passenger and freight cars, which operate by the agency of compressed air, both automatically and by hand; and it consists in a certain new and improved combination of parts, by which the brake is made more reliable in its action, simpler in its parts, and cheaper to construct.

In the accompanying drawings, Figure 1 1ᴬ is a diagrammatic view of the various parts connected with the brake, given without reference to their relative positions further than is necessary to illustrate their action. Fig. 2 is a sectional view of the brake-cylinder and parts upon a larger scale.

In both the figures the same letters of reference are used in indicating the same parts.

Fig. 1 and 1ᴬ is a continuous figure, the left-hand end of the main pipe in Fig. 1ᴬ joining on the right-hand end of the same pipe in Fig. 1.

A is the air-pump, of any suitable pattern, which I need not describe in detail. It is located upon the engine, and pumps air into the receiver B. From the receiver a pipe, C, passes under each car, connection being made between the cars by the ordinary flexible hose, D, having a suitable coupling, D'.

E is the engineer's valve—a three-way cock of the ordinary type, such as is now used for the same service.

F is a branch pipe leading from the main pipe to the brake-cylinder G. Upon this branch there is a stop-cock, F', by opening or closing which the cylinder G is connected or disconnected with the air system of the train.

The cylinder G, with its piston H and rod H', is similar in construction to those now in use. The spiral spring I, however, is one of greater power than ordinarily used, for it must have an expansive force sufficient to apply the brakes without other assistance.

The piston-rod is connected with the brake-lever J, through which the power is transmitted to operate the brakes, which have their rods and levers variously arranged.

The system shown in the drawings is of the simplest kind, wherein K K are the wheels of the truck; L L, the brake-beams; M M, the upright levers of the brake-beams. N N are the connecting-rods between the lower ends of the levers M and opposite brake-beam; O O, the connecting-rods between the upper ends of the levers M and the prime lever J.

There will be connections P P from the lever J to the hand-brake staff Q, situated at end of car, in the usual place. It will have the ordinary pawl and ratchet-wheel, R, and a hand-wheel. (Not shown in drawings for want of space.) The connections P are partly made of chains, where they are required to wind around the lower part of staff Q.

It will be unnecessary to describe and illustrate how the parts are secured to the frame of the cars to which the brake may be applied, for there will be no change from the mode of attachment now pursued. In fact, with the exception of the change in the strength of the spring I, with a slight modification in the design of the cylinder G incident thereto, and the provision of a double connection between the lever J and the brake staff Q, there is no alteration in the parts from those of the present air-brakes extensively used on railway-cars. The essential difference alone refers to the combination of these old parts, by which an entirely new action is obtained.

The operation is as follows: Air is allowed to enter the cylinder G by operating the engineer's valve. The effect is to compress the spring I and throw the brakes off. As soon as the air is exhausted from the cylinder by either operating the engineer's valve or breaking apart of the main pipe C, as when the train of cars parts in two, then the spiral spring acts to put the brakes on. There must always be sufficient slack in one of the chains winding on the hand-brake staff to permit perfect freedom of action of the air-brake; but if it is desired that the spring I shall not act to put on the brakes, the slack may be wound up and the pawl thrown into engagement with the ratchet-wheel, and the brake thus be held away from the wheels, even after the air is exhausted from the cylinder.

When it is desired to prevent the air from entering the cylinder, as when, from any cause—such as a leaky piston—it might be preferred to rely solely on the hand-brake, then the stop-cock F' should be closed, and in this case the piston-rod had better be disconnected from the lever J.

I claim as my invention, and desire to secure by Letters Patent—

1. A brake-operating device consisting, essentially, of a cylinder within which is provided a piston and piston-rod, the latter being connected directly with the prime brake-lever, a spiral spring set behind the piston, between it and the rear end of the cylinder, expanding to drive the piston forward and set the brakes, and a pipe leading air into the cylinder at the forward end from a suitable reservoir supplied by an air-pump, a suitable controlling-valve being placed upon said pipe, so that air under pressure may be admitted into the cylinder to force back the piston and draw off the brakes, substantially as described.

2. The combination, with a device for operating brakes by air under pressure and a spring of strong tension, substantially as described, of a hand-brake staff, Q, with pawl and ratchet R, and two connections, P, to the prime brake-lever J, also connected with the main brake-operating device, as above, by which the said device may be assisted in its action or locked up and held out of service, as and for the purpose set forth.

EVAN L. REESE.

Witnesses:
GEORGE PARDY,
SAML. T. BIRDSALL.